United States Patent [19]

Cave et al.

[11] Patent Number: 5,563,779
[45] Date of Patent: Oct. 8, 1996

[54] METHOD AND APPARATUS FOR A REGULATED SUPPLY ON AN INTEGRATED CIRCUIT

[75] Inventors: Michael D. Cave, Pflugerville; Mauricio A. Zavaleta, Austin, both of Tex.

[73] Assignee: Motorola, Inc., Schaumburg, Ill.

[21] Appl. No.: 349,291

[22] Filed: Dec. 5, 1994

[51] Int. Cl.[6] .............................. H02M 3/18; H02M 7/00
[52] U.S. Cl. .................. 363/59; 363/74; 363/60; 320/1
[58] Field of Search ...................... 363/59, 60, 74, 363/78; 320/1

[56] References Cited

U.S. PATENT DOCUMENTS 4,467,248 8/1984 Watanabe et al. ........................ 320/1
5,262,934 11/1993 Price ........................................ 363/60
5,306,954 4/1994 Chan et al. .............................. 363/60
5,491,623 2/1996 Jansen ..................................... 363/60
5,499,183 3/1996 Kobatake ................................ 363/59

Primary Examiner—Stuart N. Hecker

[57] ABSTRACT

A regulated supply (10) includes a charge pump (12), an output (14), a sensing circuit (16), and a control circuit (18). The charge pump (12) includes a variable capacitor (33) whose capacitance $C_v$ may be varied to compensate for changing loads and input power supply levels. The sensing circuit (16) senses the voltage level at the output (14) and provides feedback signals (66) and (68) to the control circuit (18). The voltage at the output (14) is dependent upon the capacitance $C_v$ of the variable capacitor (33). Therefore, responsive to the feedback signals (66) and (68) from the sensing circuit, the control circuit (18) varies the capacitance $C_v$ of the variable capacitor (33). The control circuit (18) then may vary the value of $C_v$ in a step-like manner to correct for the voltage at the output (14).

15 Claims, 5 Drawing Sheets

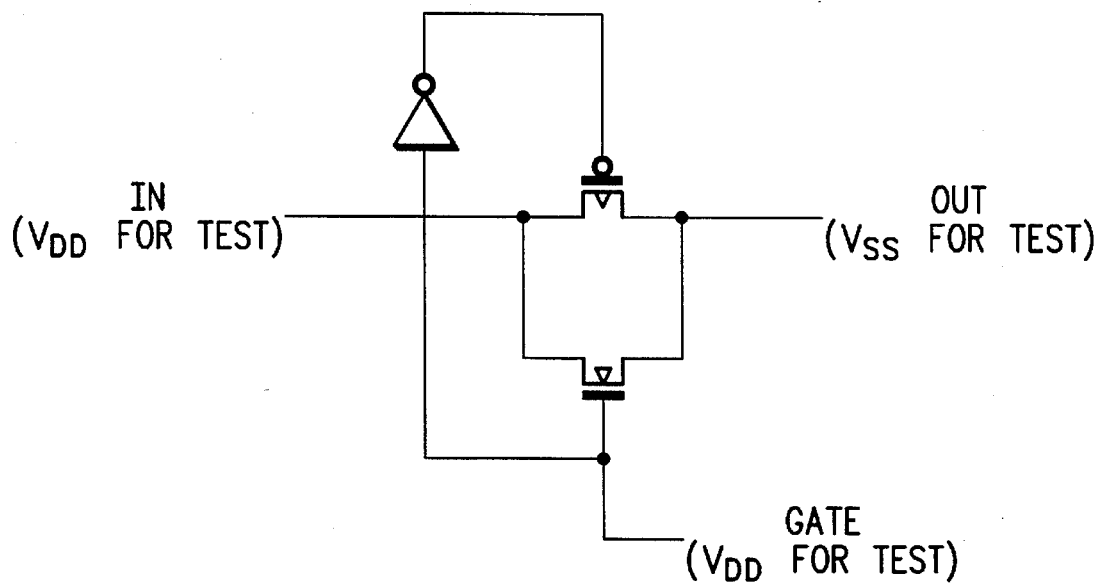
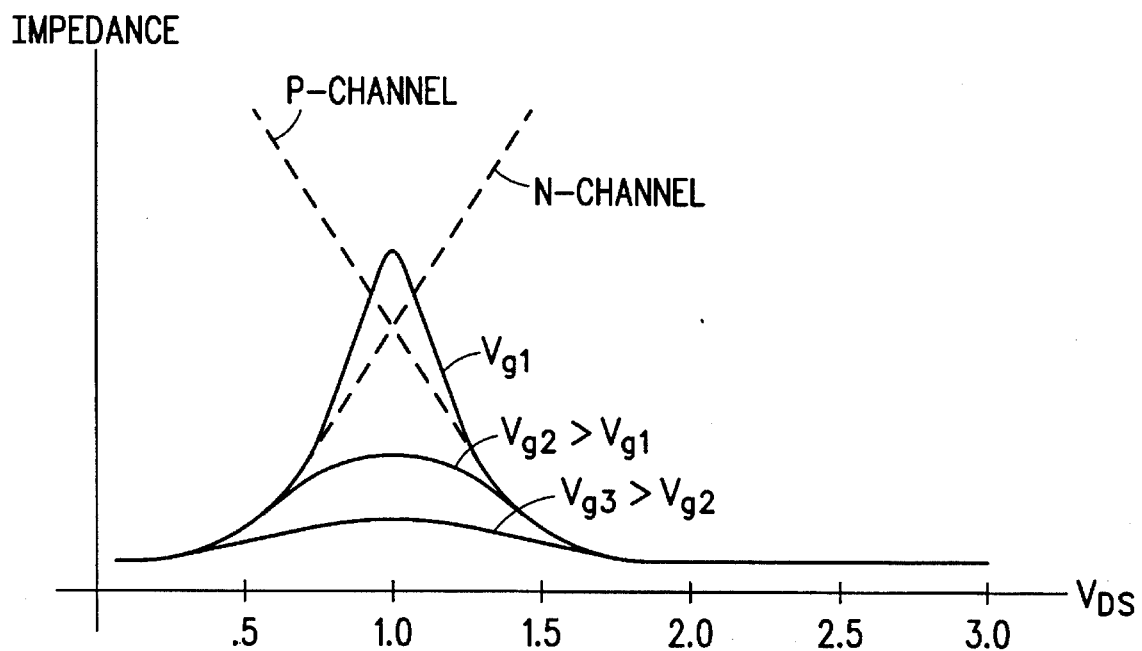
FIG. 1
—PRIOR ART—

METHOD AND APPARATUS FOR A REGULATED SUPPLY ON AN INTEGRATED CIRCUIT

FIELD OF THE INVENTION

The present invention relates generally to electrical supplies and more particularly to a regulated supply that may act either as a power supply or a clock amplification circuit to provide an output at an increased level.

BACKGROUND OF THE INVENTION

Low voltage integrated circuitry has steadily improved over the years. Presently, low voltage integrated circuit devices commonly operate in the two to three volt range. Low voltage operation provides, among other benefits, low power consumption. Thus, in battery operated devices, such as portable telephones, pagers, lap-top computers and the like, low voltage integrated circuitry allows the devices to operate proportionally longer than devices operating at higher voltages.

Low voltage operation, while providing many benefits, causes problems with respect to some of the circuitry contained in the integrated circuit. Field effect transistors, which are commonly used for switching, require minimum gating voltages to operate in favorable ranges. One such device that has minimum gating requirements is called a T-gate. T-gates are commonly used as series elements in MOS implementations. A typical T-gate comprises the parallel combination of a P-channel MOS device and an N-channel MOS device, connected such that the drains of the devices connect and the sources of the devices connect. The T-gate is turned-on to pass current when the gate of the P-channel device is held at a low voltage while the gate of the N-channel FET is held at a high voltage.

As illustrated in FIG. 1, however, the series impedance of a T-gate depends upon the voltages between the drains and the sources of both FET transistors and upon the voltages applied to their gates. As shown, when the gate voltage applied to the gate of the N-channel MOS device of a T-gate switch is relatively low, the series impedance of the T-gate can be large. The relationship between gate voltage and series impedance relates to the manner in which the respective MOS devices operate. With smaller drain-to-source voltages, the N-channel MOS device has a much lower series impedance. However, at larger drain-to-source voltage levels, the P-channel MOS device has a much lower series impedance. Thus, the combination of the two MOS devices has a low series impedance at very low drain-to-source voltages, rises to a peak series impedance, and then has a lower series impedance at higher drain-to-source voltages. Also, as is shown, the series impedance of the T-gate reduces dramatically with an increased gate voltage applied to the gate voltage on the N-channel device. As one skilled in the art will readily appreciate a reduction in gate voltage on the P-channel device will also dramatically reduce the series impedance of the T-gate.

Thus, in order to reduce the series impedance of the T-gate switches, it is desirable to provide sufficient gate voltages to the T-switches. However, in low voltage, low power applications, the source voltage $V_{DD}$ is typically very small. Resultantly, circuits have been developed to amplify the source voltage $V_{DD}$ for switching applications.

One such device used to amplify voltages is called a charge pump. Charge pumps, supplied by a source voltage $V_{DD}$, operate in a two-stage switched mode to provide an amplified voltage at an output. In a first phase of the charge pump's operation, a capacitor is charged with a source voltage to the level of the source voltage. Then, on a second phase of the charge pump's operation, the circuit is switched such that the source voltage and capacitor are connected in series to an output so as to create an amplified voltage at the output. The charge pump is capable of providing as much as twice the source voltage $V_{DD}$ at the output. Charge pumps may be employed as power supplies by driving output capacitors, as clock supplies by grounding the output, and other devices known in the art.

While the charge pump provides an increased voltage to circuits that require increased voltages, the supplied voltage level varies depending on load variations and battery supply variations. When the load is relatively large and the battery supply is relatively low, the charge pump supplied voltage will be low and thus exhibiting the same problems as mentioned above. Contrastly, when the load is relatively small and the battery supply is relatively large, the charge pump supplied voltage may be too large, which can destroy oxide layers and otherwise reduce the lifecycle of the integrated circuit elements. Thus, regulating the output voltage of the charge pumps is important.

A prior art method of regulating the output voltage of a charge pump included stacking diodes at the output of the charge pump to prevent the output voltage from exceeding a maximum voltage. When the output voltage of the charge pump reached the "turn-on" voltage of the diode stack, current flowed through the diode stack to ground. In low power applications, any current drain is undesirable. Therefore, while this technique prevents overvoltage conditions, it has the very undesirable side effect of increased power consumption and does not regulate the charge pump voltage for undervoltage conditions.

Thus, a need exists for a regulated charge pump that does not shunt charge to ground and that automatically reacts to changing load conditions so as to protect against over voltage conditions and under voltage conditions.

BRIEF DESCRIPTION OF THE DRAWINGS

FIG. 1 illustrates a T-gate switch and typical series impedance characteristics of a T-gate switch at various gate voltages and drain-to-source voltages;

DETAILED DESCRIPTION OF THE DRAWINGS

Generally, the present invention provides a regulated supply and a related method of operation. This is accomplished by providing a charge pump that includes a variable capacitor, a sensing circuit, and a control circuit. The sensing circuit senses an output voltage produced by the charge pump and provides a control signal representative of this output voltage to the control circuit. The control circuit, based on the control signal, generates a capacitance control signal which causes the capacitance of the variable capacitor to change. By changing the capacitance of the variable capacitor, the output voltage is regulated to a relationship between the variable capacitor and an output capacitor. With such a method and apparatus, over voltage conditions and under voltage conditions are prevented without clamping the voltage with diodes and excess power consumption associated therewith.

Figure 2:
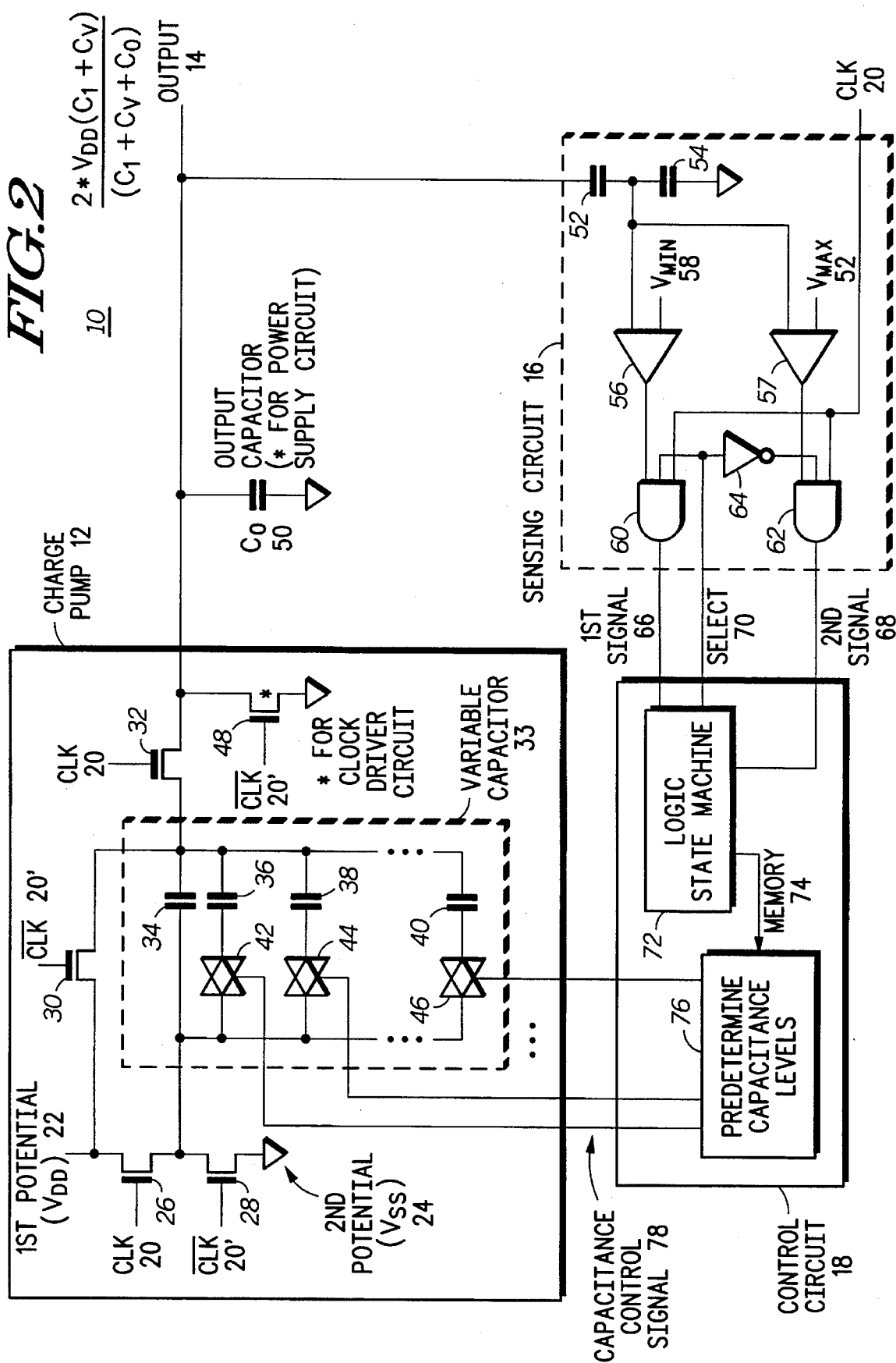
FIG. 2 illustrates an embodiment of a regulated supply in accordance with the present invention.

FIG. 2 illustrates a regulated supply 10 that comprises a charge pump 12, an output 14, a sensing circuit 16, and a control circuit 18. The components of the regulated supply 10 operate to provide a regulated output voltage $V_{out}$ at the output 14 of the supply 10. The charge pump 12 comprises a variable capacitor 33 and a plurality of switches 26–32. While the switches 26–32 may be connected in a number of ways, a preferred manner is illustrated. The switches 26–32, which are represented by N-channel FETs, "turn-on" at a logic high level, and are controlled by complementary and non-overlapping clock signals CLK 20 and CLK' (CLK bar) 20', which provide a triggering source. When CLK' 20' is at a logic high level, the charge pump 12 is in a charging state, i.e., the variable capacitor 33 is being charged to VDD through switches 28 and 30.. When CLK 20 is at a logic high level, the charge pump 12 is in a discharging state, i.e., the variable capacitor 33 is providing energy to the output 14 through switches 26 and 32. Note that the switches 26–32 could be P-channel devices, or a combination of N-channel and P-channel devices.

In the charging state, switches 28 and 30 are "on" so that a first node of the variable capacitor 33 is held at a first potential ($V_{DD}$) and the second node of the variable capacitor 33 is held at a second potential ($V_{SS}$). Thus, during the charging state, the variable capacitor 33 is charged to the voltage difference between $V_{DD}$ and $V_{SS}$. Preferably, the second potential is a ground reference potential, or a negative supply, commonly used by the circuits being driven by the regulated supply 10.

In the discharging state, switches 26 and 32 are "on" such that the first node of the variable capacitor 33 is connected to the output 14 of the regulated supply 10 and the second node of the variable capacitor 33 is held at the first potential ($V_{DD}$). Thus, in the discharging state, the series combination of the first potential $V_{DD}$ and the voltage across the variable capacitor 33 appear at the output 14. Thus, the voltage at the output is the sum of $V_{DD}$ and $V_C$ wherein $V_C$ is the voltage across the variable capacitor 33.

The variable capacitor 33 preferably comprises a primary capacitor $C_1$ 34 and N secondary capacitors, referenced generally as 36, 38, and 40. Each of the N secondary capacitors may be connected in parallel with the primary capacitor $C_1$ via N switches, referenced generally as 42, 44, and 46, such that the capacitance $C_v$ of the variable capacitor 33 as a whole may be selectively altered. As is apparent from FIG. 2, the N secondary capacitors allow the overall capacitance $C_v$ of the variable capacitor 33 to be finely tuned.

The regulated supply 10 may operate as a power supply. As a power supply the regulated supply includes an output capacitor $C_o$ 50 that connects across the output 14 to a ground reference. In operation, the output capacitor 50 provides energy to a load. Depending on the energy requirements of the load, the output capacitor 50 may be slightly discharged or greatly discharged in accordance with the equation i=C*(dV/dT). To regulate the output to a selected voltage, the output capacitor must be recharged during CLK 20. The energy needed to recharge the output capacitor will be dependent upon the amount of energy it needs to supply.

Thus, for a small discharge, the output capacitor 50 only requires minimal energy to be recharged, thus, the control circuit will enable only C1 34. For large discharges, however, the output capacitor 50 requires much more energy to be recharged to the desired level, thus the control circuit enables Cv based on the energy needed.

The regulated supply 10 may also operate as a clock driver circuit. As a clock driver, the regulated supply 10 does not include an output capacitor $C_o$ 50 but instead includes a switch 48 that connects from the output 14 to a ground reference. When the regulated supply 10 is in the charging state, the switch 48 turns "on" to pull the output 14 to the ground reference level. In the discharging state, an amplified voltage $V_{out}$ is supplied to the output 14. Operated in this fashion, the regulated supply provides a clean, amplified, clock signal that may be used to drive switches elsewhere in the integrated circuit that require a relatively higher switching voltage.

In the clock driver configuration, the output voltage $V_{out}$ behaves according to the equation: $V_{out}=(2*V_{DD}(C_1+C_v))/(C_1+C_v+C_o)$, where $C_0$ represents the capacitive load of the circuit being driven. Thus, in the clock driver application, $C_1$ should be selected to be at least equal to $C_0$, such that the minimum output voltage is $V_{DD}$ (with $C_v=0$, the above equation reduces to $2*V_{DD}*C_1/(C_1+C_0)$, with $C_1=C_0$, the equation further reduced to $2*V_{DD}*C_1/(2*C_1)$, which further reduces to $V_{DD}$). By allowing Cv to be a plurality of values, with the greatest value being much greater than C0, the maximum output value is $2V_{DD}$. Therefore, by selecting the capacitance value of the variable capacitor, the output 14 may be regulated between $V_{DD}$ and $2V_{DD}$ without a clamping diode circuit and the determents associated therewith.

The sensing circuit 16 monitors the voltage level $V_{out}$ at the output 14 and responsively provides control signals to the control circuit 18. Preferably, the sensing circuit 16 comprises a window comparator that monitors a representation of the output voltage $V_{out}$. A coupling capacitor circuit comprising a first capacitor 52 and second capacitor 54 couples the representation of the output voltage $V_{out}$ to both a first comparator 56 and a second comparator 57. The first comparator 56 compares the representation of the output voltage $V_{out}$ to a minimum threshold voltage $V_{MIN}$ and produces a logic high output when the representation of the output voltage $V_{out}$ goes below $V_{MIN}$. The second comparator 57 compares the representation of the output voltage $V_{out}$ to a maximum threshold voltage $V_{MAX}$ and produces a logic high output when the representation of the output voltage $V_{out}$ exceeds $V_{MAX}$.

The output of the first comparator 56 inputs to a first AND gate 60. CLK 20 and a select signal 70 from the control circuit 18 also input to AND gate 60. Thus, the output of AND gate 60, which serves as a first signal 66 to the control circuit 18, goes logic high only when the output of the first comparator 56, CLK 20 signal, and select signal 70 are all logic high.

The output of the second comparator 57 inputs to a second AND gate 62. CLK 20 and an inverted select signal 70 also input to AND gate 60. Inverter 64, having the select signal 70 as its input, provides an inverted select signal 70 to the second AND gate 62. The output of the second AND gate serves as the second signal 68 to the control circuit 18 and goes logic high only when the output of the second comparator 57 and CLK 20 signal are high and select signal 70 is logic low.

Thus, in operation, first signal 66 is logic high when the representation of $V_{out}$ falls below $V_{MIN}$ 58 and first AND gate 60 is enabled by CLK 20 and select signal 70. Further, second signal 68 is logic high when the representation of $V_{out}$ goes above $V_{MAX}$ and the second AND gate 62 is enabled by CLK 20 and inverted select signal 70 (through inverter 64). As one skilled in the art will appreciate, the first 60 and second 62 AND gates are enabled by the select signal 70 on a complementary basis so that contradictory information is not provided to the control circuit 18.

The control circuit 18 preferably comprises a logic state machine 72 and memory 74. The memory 74 serves to store information relating to a plurality of predetermined capacitance levels of the variable capacitor 33 that may be created by selectively switching the switches (i.e. 36, 38, and 40) associated with the secondary capacitors. Preferably, the predetermined capacitance levels $C_v$ are successively arranged from a first capacitance level wherein the variable capacitor is of a minimum capacitance to a last capacitance level wherein the variable capacitor is of a maximum capacitance.

Selection of the capacitance value of the variable capacitor is based on the table information in memory 74, which produces a capacitance control signal 78. The capacitance control signal 78 may include N bits depending on the number of capacitive levels in the variable capacitor 33. Preferably, each of the N control lines controls the state of a switch associated with a particular secondary capacitor. In any particular state, a particular secondary capacitor may contribute to the capacitance $C_v$ of the variable capacitor 33, depending upon the desired capacitance $C_v$ for that particular state. Therefore, because each of the plurality of predetermined capacitance levels differs from the next, each has a unique control line "signature" associated with it.

The logic state machine 72 selectively activates the first AND gate 60 and the second AND gate 62 so as to receive information on $V_{out}$. When $V_{out}$ is too low, then the first signal 66 becomes active. Conversely, when $V_{out}$ is too high, then the second signal 68 becomes active. Preferably, when the state machine 72 receives an active first signal 66, it increases the capacitance $C_v$ by a single level. Resultantly, $V_{out}$ increases. When the state machine 72 receives an active second signal 68, it decreases the capacitance $C_v$ by a single level. Resultantly, $V_{out}$ decreases. Thus, at each cycle of the control circuit 18, the capacitance $C_v$ may be varied a single step. Because the sensing circuit 16 continuously monitors $V_{out}$ and because the control circuit 18 continuously operates responsive to the first signal 66 and the second signal 68, the regulated supply 10 varies its output continually by varying $C_v$. Of course, as those skilled in the art will readily appreciate, other techniques could be used to vary the capacitance $C_v$ of the variable capacitor 33 to control $V_{out}$.

In operation, the regulated supply 10 provides an amplified signal at its output 14. When the voltage at the output $V_{out}$ is below a threshold, the sensing circuit 16 senses such and sends a first signal 66 to the control circuit 18. The control circuit 18 receives the first signal 66 and increases the capacitance $C_v$ of the variable capacitor 33. Resultantly, additional charge is provided by the variable capacitor 33 and the voltage at the output $V_{out}$ increases.

When the voltage at the output $V_{out}$ is too large, the sensing circuit 16 senses such and sends a second signal 68 to the control circuit 18. The control circuit 18 receives the second signal 68 and reduces the capacitance $C_v$ of the variable capacitor 33. Resultantly, less charge is provided by the variable capacitor 33 and the voltage at the output $V_{out}$ decreases.

Figure 3:
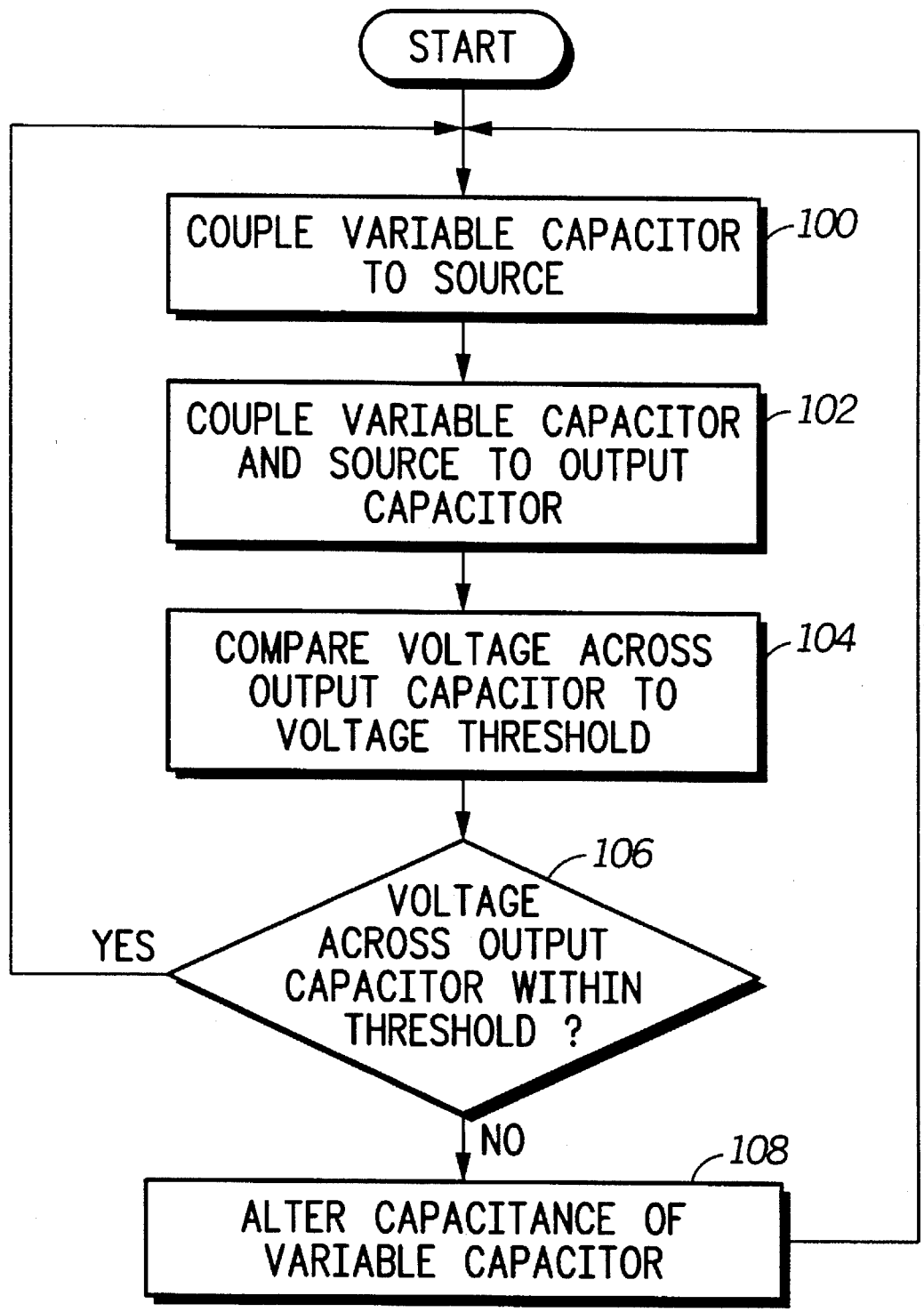
FIG. 3 illustrates a logic diagram detailing a method of operating a regulated power supply in accordance with the present invention.

FIG. 3 illustrates a logic diagram detailing a method of operating a regulated power supply. The method includes at step 100 coupling a variable capacitor 33 to a source. Preferably, a first node of the variable capacitor 33 connects to a source voltage $V_{DD}$ while a second node of the variable capacitor 33 connects to a reference ground $V_{SS}$. Thus, in step 100, a voltage is coupled across the variable capacitor 33. At step 102, the variable capacitor 33 and the source voltage $V_{DD}$ couple across an output capacitor 50 so as to apply an amplified voltage to the output capacitor 50. At step 104, a voltage across the output capacitor 50 is compared to a voltage threshold. Step 106 determines whether the voltage across the output capacitor 50 is within the threshold. If the voltage is within threshold, the method returns to step 100. If not, at step 108, the capacitance $C_v$ is altered to compensate for the non-compliant voltage $V_{out}$. Then, the method returns to step 100 to repeat the process again.

Figure 4:
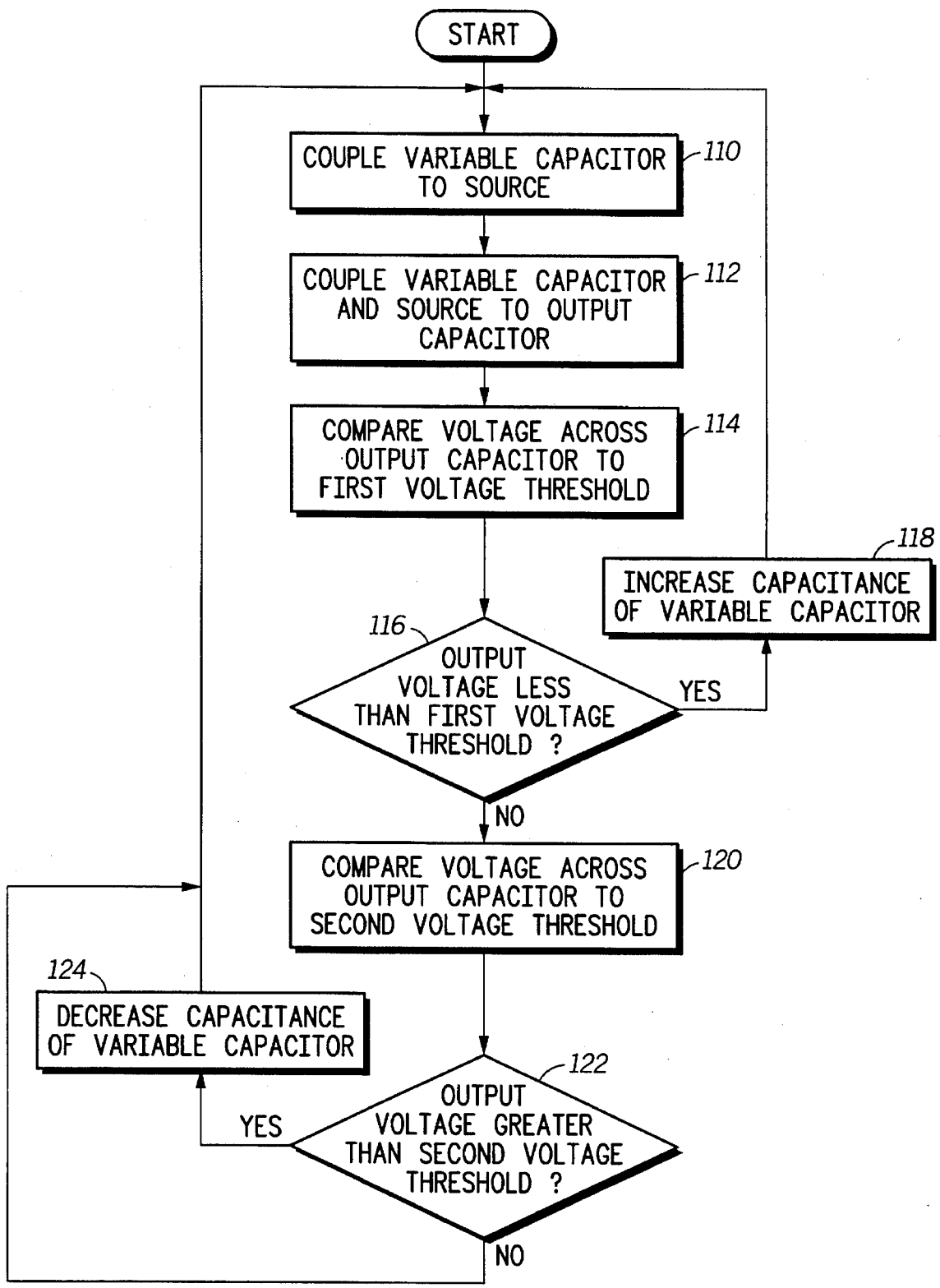
FIG. 4 illustrates a logic diagram detailing another method of operating a regulated power supply in accordance with the present invention.

FIG. 4 illustrates a logic diagram detailing a second method of operating a regulated power supply. The method includes, at step 110, coupling a variable capacitor 33 to a source. At step 112, the variable capacitor 33 and the source voltage $V_{DD}$ couple to an output capacitor so as to supply an amplified voltage to an output capacitor 50. At step 114, a voltage across the output capacitor 50 is compared to a first voltage threshold. At decision step 116, if the output voltage is less than the first threshold voltage, control goes to step 118. At step 118, the capacitance $C_v$ of the variable capacitor 33 is increased and the method proceeds to step 110. At decision step 116, if the output voltage is greater than the first threshold voltage, control goes to step 120. At step 120, the output voltage is compared to a second voltage threshold. At decision step 122, if the output voltage exceeds the second voltage threshold, control goes to step 124. If not, the method returns to step 110. At step 124, the capacitance $C_v$ of the variable capacitor is decreased in order to decrease the output voltage $V_{out}$. From step 124, the method returns to step 110 to repeat the process again.

Figure 5:
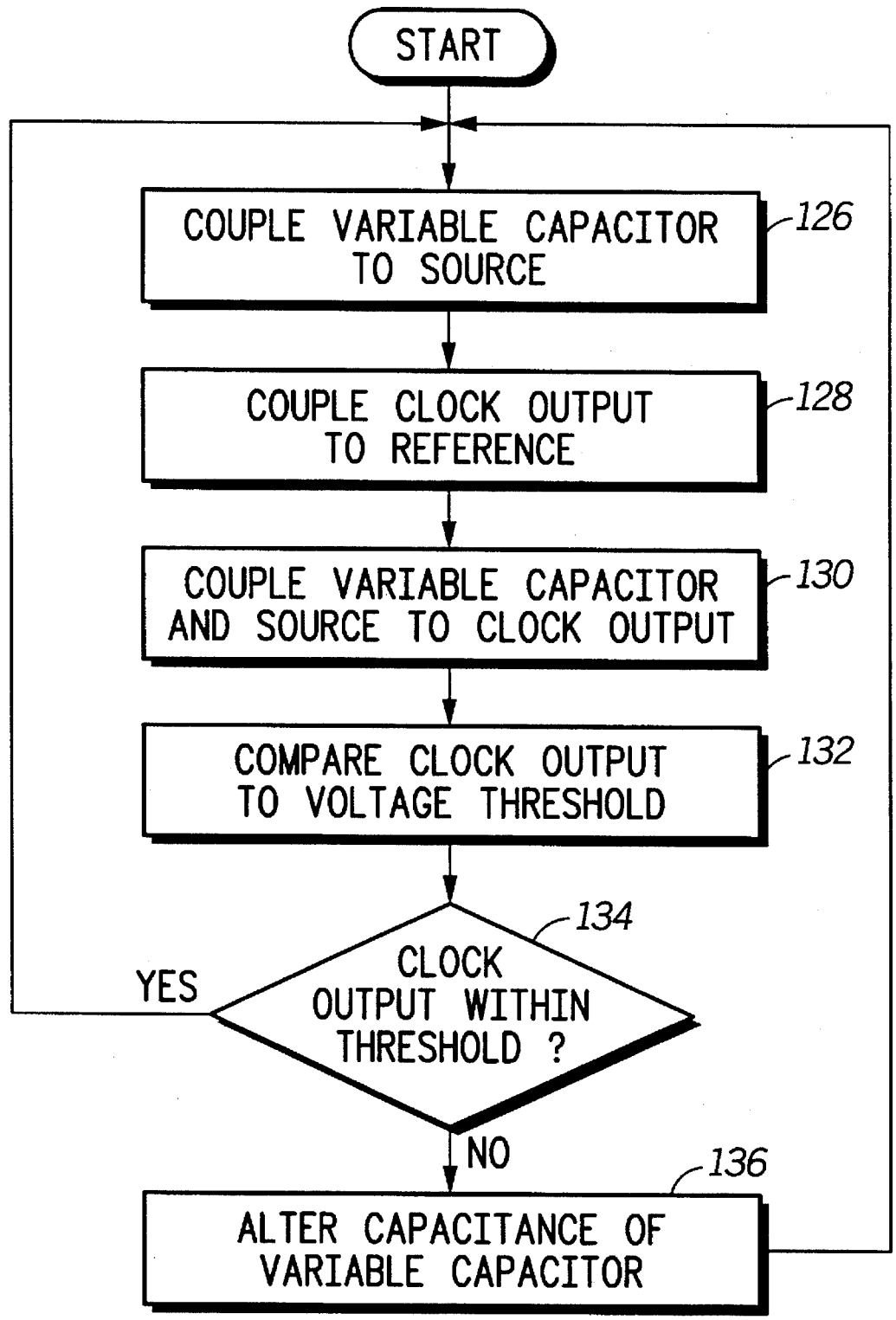
FIG. 5 illustrates a logic diagram detailing a method of operating a regulated clock supply in accordance with the present invention.

FIG. 5 illustrates a logic diagram detailing a method of operating a regulated clock supply. The method includes at step 126 coupling a variable capacitor 33 to a source. At step 128, an output 14 of the regulated clock supply couples to a reference, preferably a ground. At step 130, the variable capacitor 33 and the source voltage $V_{DD}$ couple to the output so as to apply an amplified voltage to the output 14. At step 132, a voltage $V_{out}$ at the output 14 is compared to a voltage threshold. Decision step 134 determines whether the clock output is within the threshold. If the voltage $V_{out}$ is within threshold, the method returns to step 126. If not, at step 136, the capacitance $C_v$ of the variable capacitor 33 is altered to compensate for the non-compliant voltage $V_{out}$. Then, the method returns to step 126 to repeat the process again.

The present invention provides a regulated supply and a related method of operation. This is accomplished by regulating the capacitance of a variable capacitor within a charge pump such that the output voltage is regulated based on a relationship between the variable capacitor and an output capacitor. With such a method and apparatus, over voltage conditions and under voltage conditions are prevented without clamping the voltage with diodes and excess power consumption associated therewith.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. A regulated integrated circuit power supply comprising:
   (a) a charge pump that receives a triggering source and is operably coupled to a first potential and a second potential, wherein the charge pump includes:

(i) variable capacitor having a first node and a second node, wherein a capacitance value of the variable capacitor is controlled by a capacitance control signal;

(ii) switching elements that couple the first node to the first potential and the second node to the second potential during a first phase of the triggering source, and couples the second node to the first potential during a second phase of the triggering source;

(b) output capacitor that is operably coupled to the first node during the second phase;

(c) sensing circuit operably coupled to the output capacitor, wherein the sensing circuit provides a control signal based on a comparison between an output voltage across the output capacitor and a voltage threshold; and (d) control circuit operably coupled to the sensing circuit and the charge pump, wherein the control circuit generates the capacitance control signal based on the control signal such that the voltage across the output capacitor is based on a relationship between the variable capacitor and the output capacitor.

2. The regulated integrated circuit power supply of claim 1 wherein the variable capacitor comprises a capacitor array to produce a desired capacitance between the first node and the second node.

3. The regulated integrated circuit power supply of claim 2 wherein the variable capacitor may be set by the capacitance control signal to any of a plurality of predetermined capacitance levels, the predetermined capacitance levels successively arranged from a first capacitance level wherein the variable capacitor is of a minimum capacitance to a last capacitance level wherein the variable capacitor is of a maximum capacitance.

4. The regulated integrated circuit power supply of claim 3 wherein, when the capacitance control signal changes, the capacitance value of the variable capacitor is adjusted by a single capacitance level.

5. A regulated integrated circuit power supply comprising:

(a) a charge pump that receives a triggering source and is operably coupled to a first potential and a second potential, wherein the charge pump includes:

(i) variable capacitor having a first node and a second node, wherein capacitance value of the variable capacitor is controlled by a capacitance control signal;

(ii) switching elements that couple the first node to the first potential and the second node to the second potential during a first phase of the triggering source, and couples the second node to the first potential during a second phase of the triggering source;

(b) output capacitor that is operably coupled to the first node during the second phase;

(c) sensing circuit operably coupled to the charge pump, wherein the sensing circuit provides a first signal when output voltage across the output capacitor is less than a first threshold and provides a second signal when the output voltage is greater than a second threshold, wherein the second threshold is greater than the first threshold; and (d) control circuit operably coupled to the sensing circuit and the charge pump, wherein the control circuit generates the capacitance control signal based on the first signal or the second signal.

6. The regulated integrated circuit power supply of claim 5 wherein the variable capacitor comprises a capacitor array to produce a desired capacitance between the first node and the second node.

7. The regulated integrated circuit power supply of claim 6 wherein the variable capacitor may be set by the capacitance control signal to any of a plurality of predetermined capacitance levels, the predetermined capacitance levels successively arranged from a first capacitance level wherein the variable capacitor is of a minimum capacitance to a last capacitance level wherein the variable capacitor is of a maximum capacitance.

8. The regulated integrated circuit power supply of claim 7 wherein, when the capacitance control signal changes, the capacitance value of the variable capacitor is adjusted by a single capacitance level.

9. A clock driver circuit comprising:

(a) a charge pump that receives a clock signal, is operably coupled to a first potential and a second potential, and produces a clock output, wherein the charge pump includes:

(i) variable capacitor having a first node and a second node, wherein a capacitance value of the variable capacitor is controlled by a capacitance control signal;

(ii) switching elements that couple, during a first phase of the clock signal, the first node to the first potential, the second node to the second potential, the clock output to the second potential, and couple, during a second phase of the clock signal, the second node to the first potential and the first node to the clock output;

(b) sensing circuit operably coupled to the clock output, wherein the sensing circuit provides a control signal based on a comparison between the clock output and a voltage threshold; and (c) control circuit operably coupled to the sensing circuit and the charge pump, wherein the control circuit generates the capacitance control signal based on the control signal such that magnitude of the clock output is based on a relationship between the variable capacitor and an output capacitance connected to the clock output.

10. The clock driver circuit of claim 9 wherein the variable capacitor comprises a capacitor array to produce a desired capacitance between the first node and the second node.

11. The clock driver circuit of claim 10 wherein the variable capacitor may be set by the capacitance control signal to any of a plurality of predetermined capacitance levels, the predetermined capacitance levels successively arranged from a first capacitance level wherein the variable capacitor is of a minimum capacitance to a last capacitance level wherein the variable capacitor is of a maximum capacitance.

12. The clock driver circuit of claim 11 wherein, when the capacitance control signal changes, the capacitance value of the variable capacitor is adjusted by a single capacitance level.

13. A method for providing a regulated power supply output comprising the steps of:

(a) coupling a first node of a variable capacitor to a first potential and a second node of the variable capacitor to a second potential during a first phase of a triggering source;

(b) coupling the second node of the variable capacitor to the first potential and the first node to an output capacitor during a second phase of the triggering source;

(c) comparing voltage across the output capacitor with a voltage threshold to produce a control signal; and (d) based upon the control signal, providing a capacitance control signal to the variable capacitor to control capacitance of the variable capacitor such that the voltage across the output capacitor is based on a relationship between the variable capacitor and the output capacitor.

14. A method for providing a regulated power supply output comprising the steps of:

(a) coupling a first node of a variable capacitor to a first potential and a second node of the variable capacitor to a second potential during a first phase of a triggering source;

(b) coupling the second node of the variable capacitor to the first potential and the first node to an output capacitor during a second phase of the triggering source;

(c) comparing output voltage across the output capacitor to a first and a second threshold voltage to produce a first voltage signal when the output voltage is less than a first threshold and a second voltage signal when the output voltage is greater than a second threshold, wherein the second threshold is greater than the first threshold; and (d) based upon the first voltage signal or the second voltage signal, providing a capacitance control signal to the variable capacitor to control capacitance of the variable capacitor.

15. A method for providing an amplified clock signal comprising the steps of:

(a) coupling a first node of a variable capacitor to a first potential, a second node of the variable capacitor to a second potential, and a clock output to the second potential during a first phase of a triggering source;

(b) coupling the second node of the variable capacitor to the first potential and the first node to the clock output during a second phase of the triggering source;

(c) comparing voltage at the clock output with a voltage threshold to produce a control signal; and (d) based upon the control signal, providing a capacitance control signal to the variable capacitor to control capacitance of the variable capacitor such that the voltage at the clock output is based on a relationship between the variable capacitor and an output capacitance at the clock output.

* * * * *